United States Patent
Rhodes et al.

(10) Patent No.: US 10,370,972 B2
(45) Date of Patent: Aug. 6, 2019

(54) METHOD FOR MANUFACTURING A TURBINE WHEEL

(71) Applicant: Cummins Ltd, Huddersfield (GB)

(72) Inventors: Katie Rhodes, Huddersfield (GB); Sean Winwood, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 132 days.

(21) Appl. No.: 15/543,145

(22) PCT Filed: Jan. 12, 2016

(86) PCT No.: PCT/GB2016/050063
§ 371 (c)(1),
(2) Date: Jul. 12, 2017

(87) PCT Pub. No.: WO2016/113552
PCT Pub. Date: Jul. 21, 2016

(65) Prior Publication Data
US 2018/0283176 A1    Oct. 4, 2018

(30) Foreign Application Priority Data
Jan. 16, 2015 (GB) .................................. 1500713.1

(51) Int. Cl.
*C22F 1/10* (2006.01)
*F01D 5/04* (2006.01)
(Continued)

(52) U.S. Cl.
CPC ........... *F01D 5/048* (2013.01); *B22D 21/025* (2013.01); *B22D 25/02* (2013.01); *B23P 15/006* (2013.01);
(Continued)

(58) Field of Classification Search
CPC .......... F01D 5/048; F02B 39/08; F02B 33/40; F04D 29/4206; B23P 15/006; C22F 1/00; C22F 1/10; B22D 25/02
See application file for complete search history.

(56) References Cited

U.S. PATENT DOCUMENTS

| 4,021,910 A | 5/1977 | Freeman, Jr. et al. |
| 6,328,827 B1 | 12/2001 | Bouzidi et al. |
(Continued)

FOREIGN PATENT DOCUMENTS

| CN | 103433435 A | 12/2013 |
| GB | 2152075 A | 7/1985 |
(Continued)

OTHER PUBLICATIONS

International Search Report and Written Opinion issued by the European Patent Office, dated Apr. 18, 2016, for International Application No. PCT/GB2016/050063; 11 pages.
(Continued)

*Primary Examiner* — Jessee R Roe
(74) *Attorney, Agent, or Firm* — Faegre Baker Daniels LLP

(57) ABSTRACT

A method for manufacturing a turbine wheel comprising casting the turbine wheel from an austenitic nickel-chromium-based superalloy, subjecting the cast turbine wheel to hot isostatic pressing and then subjecting a surface of the hot isostatically pressed turbine wheel to plastic deformation, wherein said hot isostatic pressing is effected at a pressure of 98 to 200 MPa and a temperature of 1160 to 1220° C. for a time period of 225 to 300 minutes. There is further described a hot isostatically pressed cast turbine wheel manufactured from an austenitic nickel-chromium-based
(Continued)

superalloy, the turbine wheel having a plastically deformed surface; and a turbocharger incorporating such a turbine wheel.

14 Claims, 3 Drawing Sheets

(51) Int. Cl.
*B23P 15/00* (2006.01)
*B24C 1/10* (2006.01)
*C22C 1/02* (2006.01)
*B22D 21/02* (2006.01)
*B22D 25/02* (2006.01)
*C22C 19/05* (2006.01)
*C22C 38/02* (2006.01)
*C22C 38/04* (2006.01)
*C22F 1/00* (2006.01)
*F02B 33/40* (2006.01)
*F02B 39/08* (2006.01)
*F04D 29/42* (2006.01)
*C21D 7/06* (2006.01)

(52) U.S. Cl.
CPC ............... *B24C 1/10* (2013.01); *C22C 1/023* (2013.01); *C22C 19/05* (2013.01); *C22C 38/02* (2013.01); *C22C 38/04* (2013.01); *C22F 1/00* (2013.01); *C22F 1/10* (2013.01); *F02B 33/40* (2013.01); *F02B 39/08* (2013.01); *F04D 29/4206* (2013.01); *C21D 7/06* (2013.01); *C21D 2211/001* (2013.01); *F05D 2220/40* (2013.01); *F05D 2230/21* (2013.01); *F05D 2230/42* (2013.01); *F05D 2230/90* (2013.01); *F05D 2300/175* (2013.01)

(56) References Cited

U.S. PATENT DOCUMENTS 6,521,059 B1   2/2003  Nazmy et al.
2009/0274560 A1  11/2009  Kubota et al.

FOREIGN PATENT DOCUMENTS

| GB | 2499669 A | 8/2013 |
| JP | H07100629 A | 4/1995 |
| WO | WO09317819 A1 | 9/1993 |
| WO | WO03046242 A1 | 6/2003 |
| WO | WO 2015/116352 A1 | 8/2015 |

OTHER PUBLICATIONS

European search report issued by the United Kingdom Intellectual Property Office, dated Sep. 24, 2015, for related Application No. GB1500713.1; 4 pages.

METHOD FOR MANUFACTURING A TURBINE WHEEL

CROSS-REFERENCE TO RELATED APPLICATIONS

The present application is a national phase filing under 35 U.S.C. § 371 of International Application No. PCT/GB2016/050063, titled "A METHOD FOR MANUFACTURING A TURBINE WHEEL," filed on Jan. 16, 2016, which claims the benefit of priority to British Patent Application No. 1500713.1, filed with the United Kingdom Intellectual Property Office on Jan. 16, 2015, the entire disclosures of which being expressly incorporated herein by reference.

FIELD OF THE DISCLOSURE

The present disclosure relates to a method for manufacturing a turbine wheel, particularly but not exclusively a turbine wheel suitable for use in a variable geometry turbocharger.

BACKGROUND

Turbochargers are well known devices for supplying air to the intake of an internal combustion engine at pressures above atmospheric pressure (boost pressures). A conventional turbocharger essentially comprises a housing in which is provided an exhaust gas driven turbine wheel mounted on a rotatable shaft connected downstream of an engine outlet manifold. Rotation of the turbine wheel rotates a compressor wheel mounted on the other end of the shaft. The compressor wheel delivers compressed air to the engine intake manifold. Turbines may be of a fixed or variable geometry type. Variable geometry turbines differ from fixed geometry turbines in that the size of the turbine inlet passage can be varied to optimize gas flow velocities over a range of mass flow rates so that the power output of the turbine can be varied to suit varying engine demands.

As a result of the operating conditions to which conventional turbine wheels are exposed during use they can fail due to fatigue. It would therefore be desirable to improve the fatigue resistance or fatigue durability of turbine wheels.

SUMMARY

It is an object of the present disclosure to manufacture a turbine wheel exhibiting improved fatigue resistance or durability.

According to a first aspect of the present disclosure there is provided a method for manufacturing a turbine wheel comprising casting the turbine wheel from an austenitic nickel-chromium-based superalloy, subjecting the cast turbine wheel to hot isostatic pressing and then subjecting a surface of the hot isostatically pressed turbine wheel to plastic deformation, wherein said hot isostatic pressing is effected at a pressure of 98 to 200 MPa and a temperature of 1160 to 1220° C. for a time period of 225 to 300 minutes.

By manufacturing the turbine wheel in this way the present disclosure addresses problems associated with turbine wheel fatigue life and provides a turbine wheel exhibiting enhanced fatigue resistance and durability as compared to turbine wheels manufactured from the same type of superalloy but that have not been subjected to hot isostatic pressing (HIP) followed by plastic deformation of a surface of the turbine wheel. The results of comparative testing presented below demonstrate that it is the combination of HIP and plastic deformation that provides the improvement in fatigue performance, performing one or other process alone does not provide the same level of improvement in performance.

Said hot isostatic pressing may be effected at a pressure of 98 to 150 MPa, 98 to 125 MPa or 98 to 108 MPa.

Said hot isostatic pressing may be effected at a temperature of 1170 to 1215° C., 1180 to 1215° C. or 1190 to 1210° C.

Said hot isostatic pressing may be effect for a time period of 225 to 280 minutes, 225 to 265 minutes or 225 to 255 minutes.

In a preferred embodiment, said hot isostatic pressing is effected at a pressure of 98 to 150 MPa and a temperature of 1170 to 1215° C. for a time period of 225 to 280 minutes.

In one embodiment, said hot isostatic pressing is effected at a pressure of 98 to 125 MPa and a temperature of 1180 to 1215° C. for a time period of 225 to 265 minutes.

In a yet another embodiment, said hot isostatic pressing is effected at a pressure of 98 to 108 MPa and a temperature of 1190 to 1210° C. for a time period of 225 to 255 minutes.

The turbine wheel may be cooled after said hot isostatic pressing and before said plastic deformation. The turbine wheel may be cooled to any desirable temperature to permit subsequent processing steps, particularly but not limited to a temperature at which said surface of the turbine wheel can be subjected to plastic deformation. For example, the turbine wheel may be cooled to around room temperature after said hot isostatic pressing so that the subsequent plastic deformation process can be carried out accurately and effectively. The turbine wheel is preferably cooled to a temperature of around 18 to 25° C. after said hot isostatic pressing and before said plastic deformation. The turbine wheel may be cooled at a rate of less than or equal to around 100° C. per minute after said hot isostatic pressing and before said plastic deformation, at a rate of less than or equal to around 50° C. per minute after said hot isostatic pressing and before said plastic deformation or at a rate of less than or equal to around 10° C. per minute after said hot isostatic pressing and before said plastic deformation.

The plastic deformation may be achieved using any appropriate process, such as laser peening, sand blasting, shot blasting etc, although it is preferred that shot peening is employed. The shot peening may employ high carbon cast steel shot conforming to SAEJ827. Cut wire, ceramic particles and/or glass beads may be used instead of or in addition to steel shot. The shot may have a minimum size of S070 to S240 in accordance with SAEJ444. Preferably the shot has a minimum size of S110 in accordance with SAEJ444, the physical and chemical characteristics of which are set out below in the description of a specific embodiment. The shot peening may be effected at an intensity to achieve an Almen 'A' strip arc height of 0.127 to 0.305 mm, 0.127 to 0.255 mm or 0.127 to 0.203 mm measured in accordance with SAEJ442.

According to a second aspect of the present disclosure there is provided a hot isostatically pressed cast turbine wheel manufactured from an austenitic nickel-chromium-based superalloy, the turbine wheel having a plastically deformed surface.

The turbine wheel according to the second aspect of the present disclosure may be conveniently manufactured using a method according to the first aspect of the present disclosure.

A third aspect of the present disclosure provides a turbocharger comprising: a housing; a turbine wheel supported on a shaft within said housing for rotation about a turbine axis;

and a compressor wheel supported on said shaft within said housing, wherein said turbine wheel is a hot isostatically pressed cast turbine wheel manufactured from an austenitic nickel-chromium-based superalloy, the turbine wheel having a plastically deformed surface.

The turbine wheel employed in the turbocharger according to the third aspect of the present disclosure may be conveniently manufactured using a method according to the first aspect of the present disclosure.

Manufacturing a turbine wheel by a process according to the present disclosure involving hot isostatic pressing followed by plastic deformation of a surface of the turbine wheel results in a turbine wheel where the plastically deformed surface exhibits different surface characteristics, such as surface finish, surface roughness and/or color, as compared to a turbine wheel manufactured from the same or a similar superalloy but which has not been subjected to hot isostatic pressing followed by plastic deformation in accordance with the present disclosure. It will be appreciated that this provides a convenient means to characterize and thereby identify a turbine wheel that has been manufactured in accordance with the present disclosure.

A plastically deformed surface of the turbine wheel may exhibit a residual compressive stress of −1000 to −1500 MPa or −1100 to −1500 MPa at a depth of 25 to 90 microns below said surface of the turbine wheel or a residual compressive stress of −1100 to −1500 MPa or −1200 to −1400 MPa at a depth of 30 to 60 microns below said surface of the turbine wheel. A plastically deformed surface of the turbine wheel may exhibit a residual compressive stress of around −1300 MPa at a depth of around 48 microns below said surface of the turbine wheel and/or or a residual compressive stress of around −1150 MPa at a depth of around 80 microns below said surface of the turbine wheel.

A plastically deformed surface of the turbine wheel may exhibit a residual compressive stress of −500 to −1200 MPa or −500 to −1000 MPa at a depth of 100 to 190 microns below said surface of the turbine wheel or a residual compressive stress of −600 to −900 MPa at a depth of 112 to 160 microns below said surface of the turbine wheel. A plastically deformed surface of the turbine wheel may exhibit a residual compressive stress of around −950 MPa at a depth of around 112 microns below said surface of the turbine wheel and/or or a residual compressive stress of around −600 MPa at a depth of around 160 microns below said surface of the turbine wheel.

The turbine wheels and turbochargers of the above-defined aspects of the present disclosure are eminently suitable for use with any type of turbocharged internal combustion engine, such as a diesel, gasoline direct injection or conventional petrol engine, where a more durable turbine wheel is desired or needed.

HIP is a form of heat treatment of a component at high pressure, which is applied to the component by an inert gas. It produces a component comprised of a fully dense bonded material. The time at elevated temperature and pressure allows plastic deformation, creep and diffusion to occur within the material of the component, which eliminates internal voids (i.e. porosity) that are inherently present in components manufactured by casting.

Shot peening is a cold working process where shot bombards a surface of a component to create a dimple. To create the dimple the surface must yield in tension, resulting in sub-surface compressive stresses.

Without wishing to be bound by any particular theory, it is believed that the HIP process reduces the opportunity for fatigue initiation in the turbine wheel by removing internal porosity while simultaneously removing inconsistent residual stress effects resulting from the casting process used to produce the turbine wheel. Subsequently subjecting a surface of the turbine wheel to plastic deformation induces a residual compressive stress in the treated surface which reduces or prevents cracks from forming and/or propagating throughout the wheel structure. Removal of the casting residual stresses allows for an improved level of compressive residual stress to be achieved through a subsequent surface plastic deformation, e.g. shot peening, process, which ultimately results in improved fatigue durability.

The turbine wheel may be manufactured from any suitable austenitic nickel-chromium-based superalloy, for example one of the Inconel™ family of superalloys, such as Inconel 713C.

While the manufacturing method of the present disclosure has been described hereinbefore in relation to the production of turbine wheels, it is envisaged that the methodology of combining HIP with surface plastic deformation, e.g. shot peening, may be advantageous in the manufacture of other types of components made using additive manufacturing techniques where porosity can have deleterious effects. A further aspect of the present disclosure thus relates to a method for manufacturing a component comprising casting the component, subjecting the cast component to hot isostatic pressing and then subjecting a surface of the hot isostatically pressed component to plastic deformation, wherein said hot isostatic pressing is effected at a pressure and a temperature for a sufficient period of time to reduce or remove internal porosity in the cast component and to provide the component with improved fatigue durability as compared to the cast component before being subjected to said combined HIP and surface plastic deformation process.

Other advantageous and features of the disclosure will be apparent from the following description.

BRIEF DESCRIPTION OF THE DRAWINGS

Specific embodiments of the present disclosure will now be described, by way of example only, with reference to the accompanying drawings, in which.

DETAILED DESCRIPTION OF EMBODIMENTS

Figure 1:
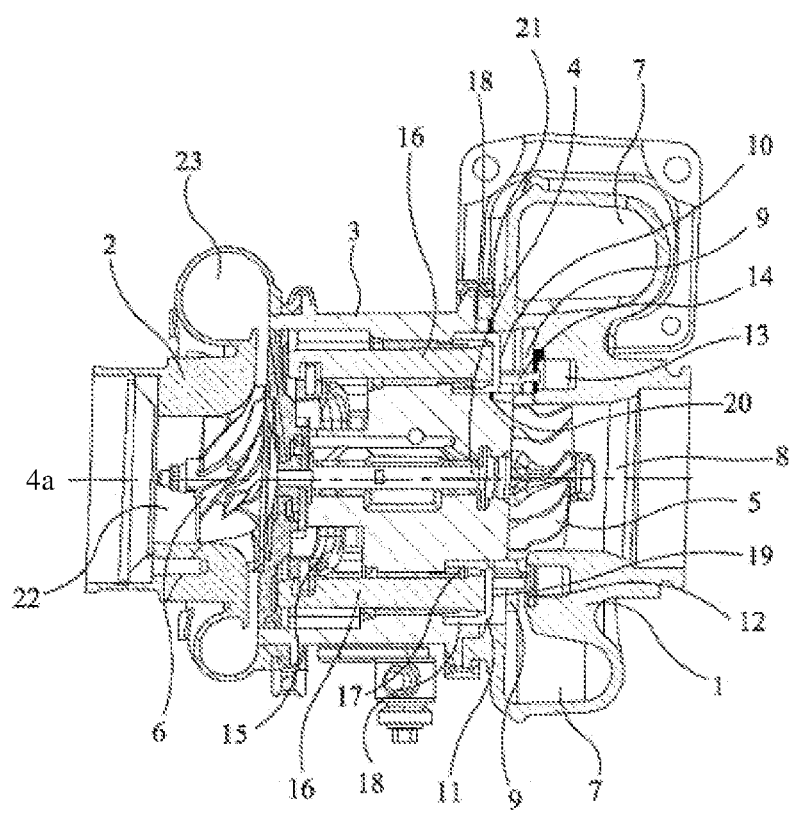
FIG. 1 is an axial cross-section through a variable geometry turbocharger incorporating a turbine wheel according to a first aspect of the present disclosure.

FIG. 1 illustrates a variable geometry turbocharger comprising a housing incorporating a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passage 8 via an annular inlet passage 9 and the turbine wheel 5. The inlet passage 9 is defined on one side by a face 10 of a radial wall of a movable annular wall member 11, commonly referred to as a "nozzle ring", and on the opposite side by an annular shroud 12 which forms the wall of the inlet passage 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passage 9. The vanes 14 are orientated to deflect gas flowing through the inlet passage 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled. The speed of the turbine wheel 5 is dependent upon the velocity of the gas passing through the annular inlet passage 9. For a fixed rate of mass of gas flowing into the inlet passage 9, the gas velocity is a function of the width of the inlet passage 9, the width being adjustable by controlling the axial position of the nozzle ring 11. FIG. 1 shows the annular inlet passage 9 fully open. The inlet passage 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 21 is supported within an annular groove formed in the radially outer annular surface of the cavity 19 and bears against the outer annular flange 18 of the nozzle ring 11.

Gas flowing from the inlet volute 7 to the outlet passage 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
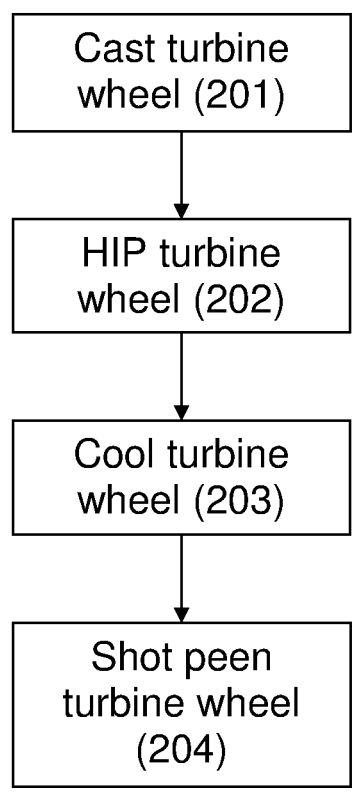
FIG. 2 is a flow diagram illustrating steps involved in the manufacture of a turbine wheel by a method in accordance with an embodiment of the present disclosure.

The turbine wheel 5 shown in FIG. 1 was manufactured as explained below with reference to FIG. 2. In step 201 the turbine wheel is cast, using a conventional investment casting process, from a suitable austenitic nickel-chromium-based superalloy, such as Inconel 713C. In step 202, the cast turbine wheel is subjected to hot isostatic pressing at a pressure of 103±5 MPa and a temperature of 1200±10° C. for a time period of 240±15 minutes. In step 203, the turbine wheel is cooled to 18 to 25° C. at a rate of less than 10° C. per minute. In step 204, a surface of the turbine wheel is shot peened using high carbon cast steel shot conforming to SAEJ827, having a minimum size of S110 in accordance with SAEJ444 and at an intensity to achieve an Almen 'A' strip arc height of 0.127 to 0.203 mm measured in accordance with SAEJ442. In step 204, it is preferred that as close as possible to 100% of the external surface of the turbine wheel is subjected to shot peening, except for the back face weld boss area of the turbine wheel, which ideally is not shot peened, for example by some form of suitable masking applied to that region of the turbine wheel prior to shot peening.

SAE J827 is the international standard which describes the chemical composition, hardness, microstructure and physical characteristic requirements for high carbon steel shot to be used for shot peening applications. The properties of shot conforming to SAEJ827 and having a minimum size of S110 in line with SAEJ444 are set out below.

Chemical Composition:

| Element | % |
| --- | --- |
| Carbon | 0.8-1.2 |
| Manganese | 0.6-1.2 |
| Silicon | 0.4 minimum |
| Sulphur | 0.05 maximum |
| Phosphorous | 0.05 maximum |

Microstructure: Uniform tempered martensite.

Hardness; SAE J827 specification. 40 to 51 HRC.

Apparent Density; 7 glee minimum

Defects: To meet the requirement of ISO 11124/3 and SAEJ827.

Nominal Size: 0.30 mm

| Tolerance | Screen Number | mm |
| --- | --- | --- |
| All pass | 30 screen | 0.600 |
| 10% min retained | 35 screen | 0.500 |
| 80% min retained | 50 screen | 0.300 |
| 90% min retained | 80 screen | 0.180 |

Figure 3:
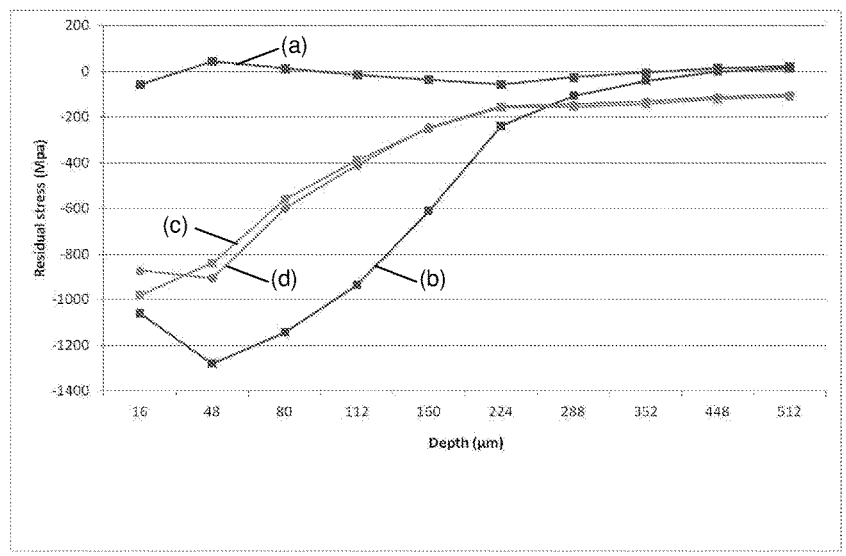
FIG. 3 is a graph of residual compressive stress against depth below a surface of turbine wheels subjected to (a) HIP alone, (b) HIP and shot peen combined in accordance with the present disclosure, (c) shot blasting alone, and (d) shot and sand blasting.

The residual stress at different depths below the surface of turbine wheels subjected to (a) HIP alone, (b) HIP and shot peening combined in accordance with the present disclosure, (c) shot blasting alone, and (d) shot and sand blasting, is illustrated in FIG. 3. As can be seen, across a wide range of depths, from 16 to 224 microns (μm), the turbine wheel manufactured according to the present disclosure exhibited a residual stress greater in magnitude than the three turbine wheels manufactured using alternative methods involving just HIP or plastic deformation alone.

A comparative test of turbine wheels manufactured using different methods was carried out to investigate the approximate high cycle fatigue (HCF) life. The results are presented below. The results for the turbine wheel manufactured according to the method of the present disclosure are underlined and clearly demonstrate an improvement in fatigue durability.

| Manufacturing Method | ~Min life (hrs) | ~Max life (hrs) | ~Mean life (hrs) | No. data points |
| --- | --- | --- | --- | --- |
| No HIP or Shot Peen | 1.5 | 18 | 10 | 30 |
| HIP Alone | 2 | 9 | 5.5 | 10 |
| Shot Peen Alone | <1 | 12 | 6.5 | 10 |
| HIP & Shot Peen | 4 | 40 | 22 | 20 |

It will be appreciated that numerous modifications may be made to the preferred embodiments described above without departing from the underlying inventive concepts defined in the various aspects of the present disclosure. Moreover, any one or more of the above described preferred embodiments could be combined with one or more of the other preferred embodiments to suit a particular application.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A method for manufacturing a turbine wheel comprising casting the turbine wheel from an austenitic nickel-chromium-based superalloy, subjecting the cast turbine wheel to hot isostatic pressing and then subjecting a surface of the hot isostatically pressed turbine wheel to plastic deformation, wherein said hot isostatic pressing is effected at a pressure of 98 to 200 MPa and a temperature of 1160 to 1220° C. for a time period of 225 to 300 minutes.

2. A method according to claim 1, wherein said hot isostatic pressing is effected at a pressure of 98 to 108 MPa.

3. A method according to claim 1, wherein said hot isostatic pressing is effected at a temperature of 1190 to 1210° C.

4. A method according to claim 1, wherein said hot isostatic pressing is effected for a time period of 225 to 255 minutes.

5. A method according to claim 1, wherein said turbine wheel is cooled to a temperature of around 18 to 25° C. after said hot isostatic pressing and before said plastic deformation.

6. A method according to claim 5, wherein said turbine wheel is cooled at a rate of less than or equal to around 100° C. per minute after said hot isostatic pressing and before said plastic deformation.

7. A method according to claim 5, wherein said turbine wheel is cooled at a rate of less than or equal to around 10° C. per minute after said hot isostatic pressing and before said plastic deformation.

8. A method according to claim 1, wherein said plastic deformation is achieved using shot peening.

9. A method according to claim 8, wherein said shot peening employs high carbon cast steel shot conforming to SAEJ827.

10. A method according to claim 8, wherein said shot has a minimum size of S070 to S240 in accordance with SAEJ444.

11. A method according to claim 8, wherein said shot has a minimum size of S110 in accordance with SAEJ444.

12. A method according to claim 8, wherein said shot peening is effected at an intensity to achieve an Almen 'A' strip arc height of 0.127 to 0.305 mm measured in accordance with SAEJ442.

13. A method according to claim 8, wherein said shot peening is effected at an intensity to achieve an Almen 'A' strip arc height of 0.127 to 0.203 mm measured in accordance with SAEJ442.

14. A turbine wheel produced using the method of claim 1.

* * * * *